(12) United States Patent
Komatsu et al.

(10) Patent No.: US 11,066,855 B2
(45) Date of Patent: Jul. 20, 2021

(54) GLOVE COMPARTMENT

(71) Applicants: KABUSHIKI KAISHA TOYOTA JIDOSHOKKI, Kariya (JP); TOYOTA JIDOSHA KABUSHIKI KAISHA, Toyota (JP)

(72) Inventors: Masayuki Komatsu, Kariya (JP); Yoshihiko Yasui, Kariya (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 326 days.

(21) Appl. No.: 16/247,815

(22) Filed: Jan. 15, 2019

(65) Prior Publication Data
US 2019/0218834 A1 Jul. 18, 2019

(30) Foreign Application Priority Data

Jan. 18, 2018 (JP) .............................. JP2018-006770

(51) Int. Cl.
| | |
|---|---|
| *E05B 83/30* | (2014.01) |
| *E05B 85/22* | (2014.01) |
| *B60R 7/06* | (2006.01) |
| *E05C 9/04* | (2006.01) |
| *E05B 77/44* | (2014.01) |

(52) U.S. Cl.
CPC ............... *E05B 83/30* (2013.01); *B60R 7/06* (2013.01); *E05B 85/22* (2013.01)

(58) Field of Classification Search
CPC .......... E05B 83/30; E05B 85/22; E05B 77/44; E05B 83/28; B60R 7/06; B60R 2011/005; E05C 9/041

USPC .................. 70/416–418; 292/346; 296/37.12
See application file for complete search history.

(56) References Cited

U.S. PATENT DOCUMENTS

| | | | | |
|---|---|---|---|---|
| 4,154,468 A | * | 5/1979 | Leon .................... | E05B 17/2003 292/346 |
| 4,171,837 A | * | 10/1979 | McRoy ............... | E05B 15/0205 292/346 |
| 4,345,787 A | * | 8/1982 | Dabrowski ......... | E05B 17/2003 292/346 |
| 5,074,606 A | * | 12/1991 | Priola ................. | E05B 17/2003 292/346 |

(Continued)

FOREIGN PATENT DOCUMENTS

JP 2016-084001 A 5/2016

*Primary Examiner* — Lloyd A Gall
(74) *Attorney, Agent, or Firm* — Sughrue Mion, PLLC (57) ABSTRACT

A latch mechanism is configured to be shifted between a closed state in which a glove door is held on a compartment body at a closed position and an open state in which the glove door is not held on the compartment body. An operation lever is operated to shift the lock mechanism from the closed state to the open state. When the latch mechanism is shifted to the closed state, the first engaging member is engaged with the engagement hole. When the latch mechanism is shifted to the open state, the first engaging member is disengaged from the engagement hole. The compartment body includes an operation restriction wall that restricts operation of the first engaging member from the side surface of an instrument panel or the side surface of the compartment body so that the first engaging member is not disengaged from the engagement hole.

3 Claims, 9 Drawing Sheets

(56) References Cited

U.S. PATENT DOCUMENTS

| | | | |
|---|---|---|---|
| 2006/0267364 A1* | 11/2006 | Katagiri | E05B 83/30 |
| | | | 296/37.12 |
| 2008/0007081 A1* | 1/2008 | Shibata | E05B 47/0009 |
| | | | 296/37.12 |
| 2012/0261937 A1* | 10/2012 | Buchheit | E05B 63/242 |
| | | | 296/37.12 |
| 2015/0240539 A1* | 8/2015 | Abe | E05B 63/248 |
| | | | 296/37.12 |

* cited by examiner

RELATED ART

GLOVE COMPARTMENT

BACKGROUND

The following description relates to a glove compartment.

Japanese Laid-Open Patent Publication No. 2016-84001 discloses a typical glove compartment. The glove compartment is attached to an instrument panel located in a passenger compartment. The glove compartment includes a compartment body, a side panel, a glove door, a latch mechanism, and an operation unit.

The compartment body includes an opening through which the inside of the compartment body is in communication with the passenger compartment. The compartment body is fixed to the instrument panel. The side panel is removably attached to the instrument panel and arranged on a side surface of the instrument panel. The glove door is attached to the compartment body. The glove door is movable between a closed position that closes the opening and an open position that opens the opening to the passenger compartment.

The latch mechanism can be shifted between a closed state in which the latch mechanism holds the glove door on the compartment body at the closed position and an open state in which the latch mechanism does not hold the glove door on the compartment body. The latch mechanism includes an engaged portion and an engaging member. The engaged portion is formed near the side panel inside the compartment body. The engaging member is arranged on the glove door. When the latch mechanism is shifted to the closed state, the engaging member is engaged with the engaged portion. When the latch mechanism is shifted to the open state, the engaging member is disengaged from the engaged portion. The operation unit is operated to shift the latch mechanism from the closed state to the open state.

In the above-described glove compartment, if the latch mechanism is shifted to the closed state when the glove door is at the closed position, the glove door is maintained at the closed position and continuously closes off the opening of the compartment body. If an occupant or the like of the vehicle operates the operation unit when the glove door is at the closed position, the latch mechanism is shifted to the open state. As a result, the glove door will no longer be held on the compartment body and thereby be moved from the closed position to the open position. This allows the occupant to remove articles from the compartment body.

Although the glove compartment of Japanese Laid-Open Patent Publication No. 2016-84001 does not disclose a lock mechanism, such type of a glove compartment may include a lock mechanism. The lock mechanism may be shifted between an unlock position that permits operation of the latch mechanism with the operation unit and a lock position that restricts operation of the latch mechanism with the operation unit. Thus, with the glove compartment including the lock mechanism, even if the operation unit is operated, the glove door cannot be moved to the open position as long as the glove door is at the closed position, the latch mechanism is in the closed state, and the lock mechanism is at the lock position. This prevents theft of articles from the compartment body.

However, with the above-described typical glove compartment, if the side panel is removed from the instrument panel, the engaging member can be operated from the side surface of the instrument panel with a tool such as a screwdriver. When the engaging member is disengaged from the engaged portion, the latch mechanism can be shifted from the closed state to the open state and the glove door can be moved from the closed position to the open position without operating the operation unit. In this case, the theft of articles from the compartment body cannot be prevented even if the lock mechanism restricts operation of the operation unit.

SUMMARY

It is an object of the following description to provide a glove compartment that effectively prevents stealing.

One embodiment provides a glove compartment arranged in an instrument panel located in a passenger compartment. The glove compartment includes a compartment body fixed to the instrument panel, wherein the compartment body includes an opening through which an inside of the compartment body and the passenger compartment are in communication; a side panel attached in a removable manner to at least one of the instrument panel or the compartment body, wherein the side panel forms a side surface of the instrument panel or a side surface of the compartment body; a glove door arranged on the compartment body and movable between a closed position that closes the opening and an open position that opens the opening to the passenger compartment; a latch mechanism configured to be shifted between a closed state in which the glove door is held on the compartment body at the closed position and an open state in which the glove door is not held on the compartment body; an operation unit operated to shift the latch mechanism from the closed state to the open state; and a lock mechanism configured to be shifted between an unlock position that allows operation of the latch mechanism with the operation unit and a lock position that restricts operation of the latch mechanism with the operation unit. The latch mechanism includes an engaged portion formed near the side panel inside the compartment body, and an engaging member arranged on the glove door, wherein the engaging member is engaged with the engaged portion in the closed state and disengaged from the engaged portion in the open state. The compartment body includes an operation restriction body that restricts operation of the engaging member from the side surface of the instrument panel or the side surface of the compartment body so that the engaging member is not disengaged from the engaged portion.

Other aspects and advantages of the embodiments will become apparent from the following description, taken in conjunction with the accompanying drawings, illustrating by way of example the principles of the disclosure.

BRIEF DESCRIPTION OF THE DRAWINGS

The embodiments, together with objects and advantages thereof, may best be understood by reference to the following description of the presently preferred embodiments together with the accompanying drawings in which:

FIG. 5 is a perspective view of an operation restriction body or the like;

DETAILED DESCRIPTION

First and second embodiments will now be described with reference to the drawings.

First Embodiment

Figure 1:
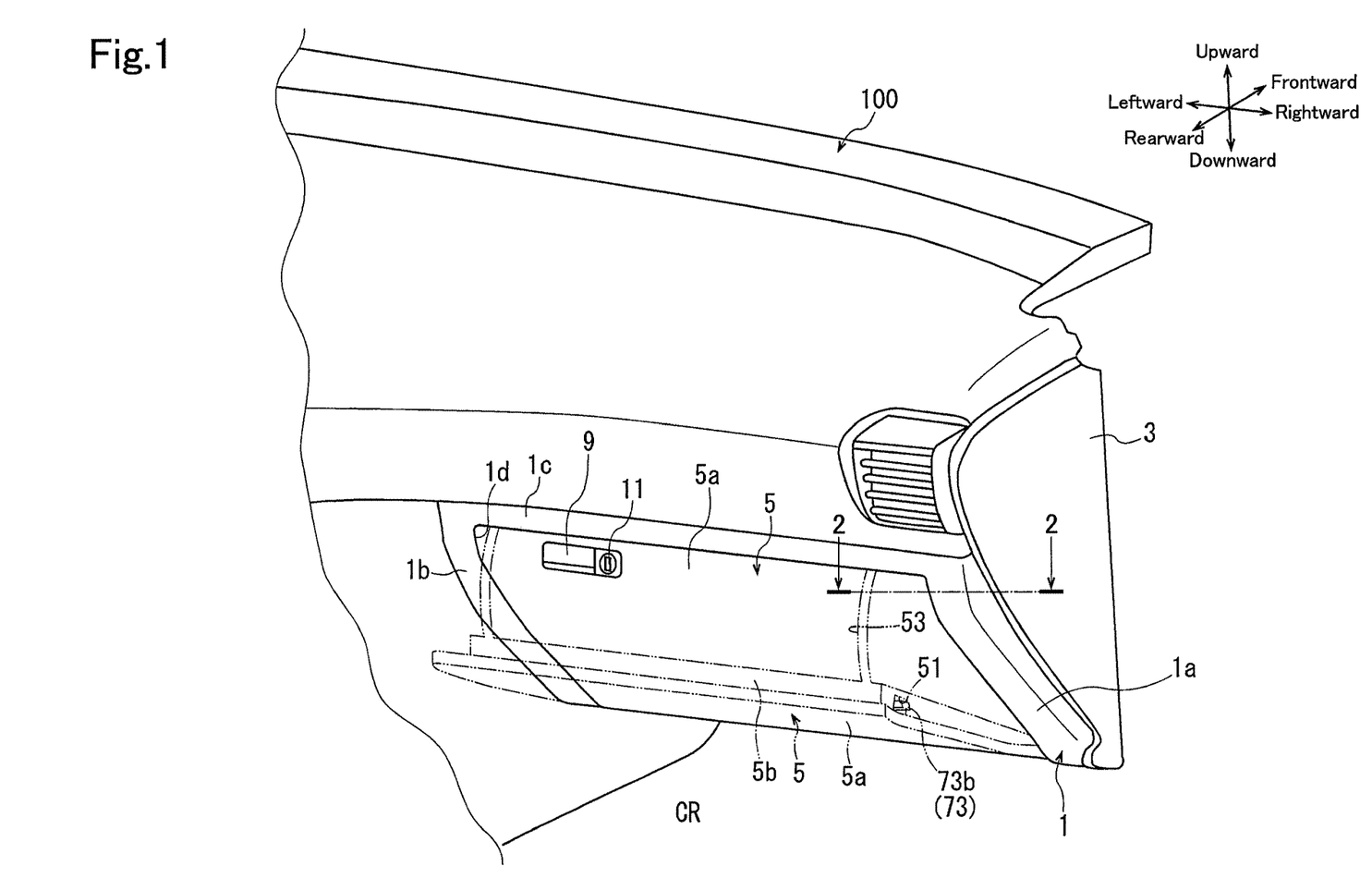
FIG. 1 is a perspective view of a glove compartment according to a first embodiment.
Figure 2:
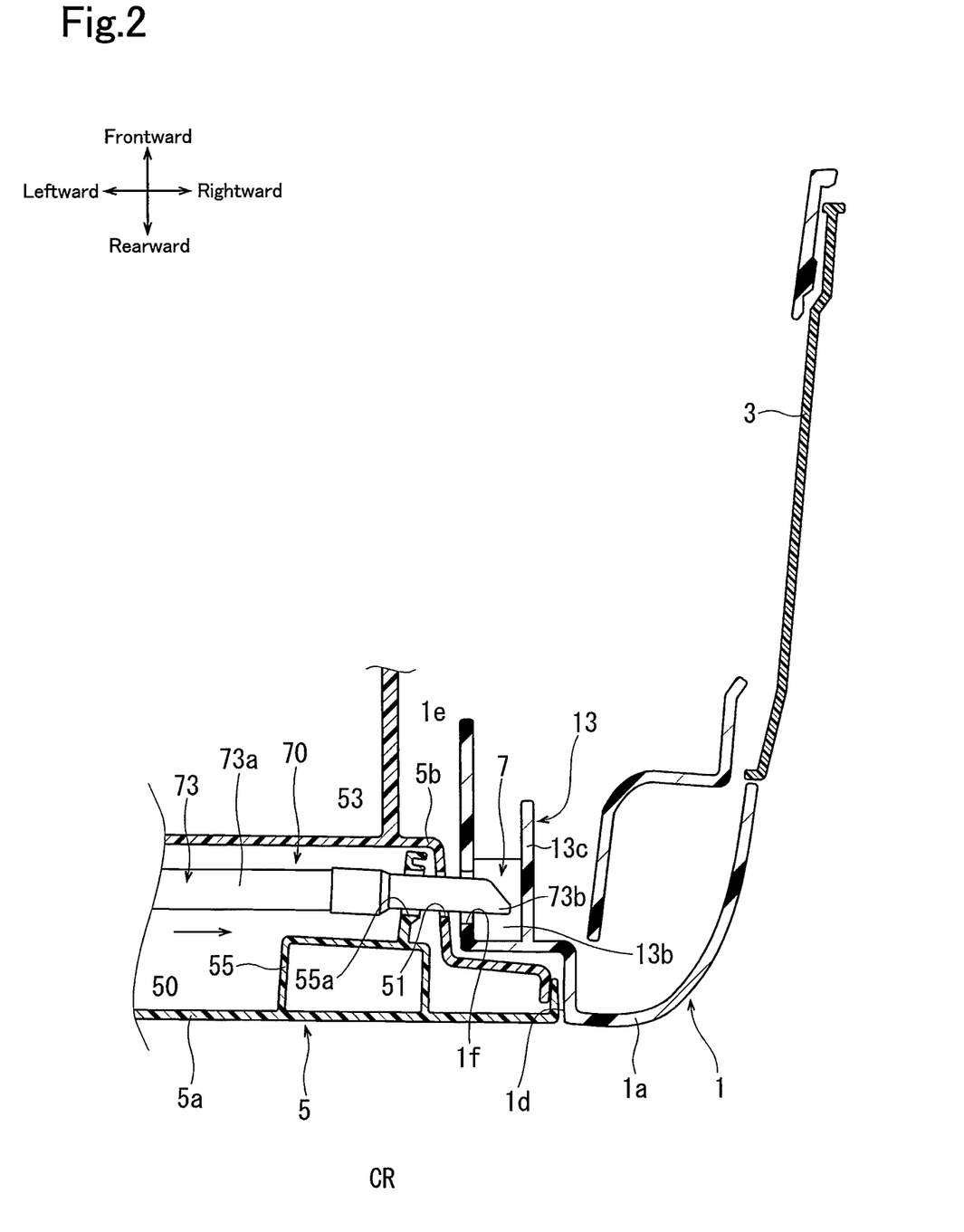
FIG. 2 is a schematic cross-sectional view taken along line 2-2 of FIG. 1.
Figure 3:
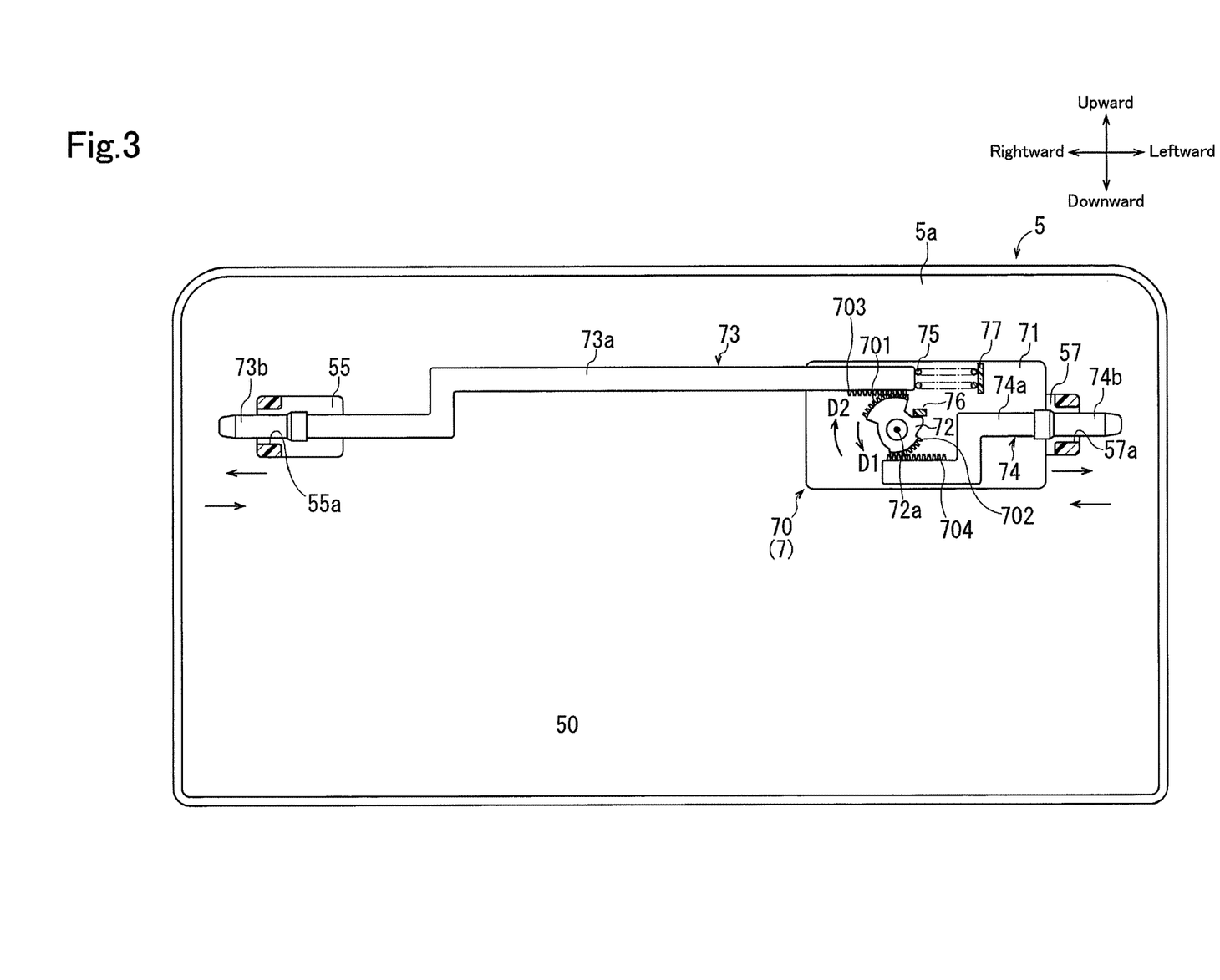
FIG. 3 is a rear view of a glove door and a latch mechanism.

As shown in FIG. 1, a glove compartment of the first embodiment includes a compartment body 1, a side panel 3, a glove door 5, a latch mechanism 7 shown in FIGS. 2 and 3, an operation lever 9 serving as an operation unit, and a key cylinder 11 serving as a lock mechanism. The glove compartment is attached to an instrument panel 100. The instrument panel 100 is located in a passenger compartment CR. A device such as a fuse box (not shown) may be accommodated in the instrument panel 100.

The arrows shown in FIG. 1 indicate upward, downward, rightward, leftward, frontward, and rearward directions. The arrows shown in the other drawings are in accordance with FIG. 1. These directions are examples. In the present embodiment, the glove compartment is arranged on the lower right portion of the instrument panel 100. However, the glove compartment may be arranged on the lower left portion of the instrument panel 100.

The compartment body 1 is fixed to the lower right portion of the instrument panel 100 by screws (not shown). The compartment body 1 is made of plastic. The compartment body 1 includes a right side wall 1a, a left side wall 1b, and an upper wall 1c. The right side wall 1a and the left side wall 1b each extend in the vertical direction of the compartment body 1. The upper wall 1c extends in the sideward direction of the compartment body 1. A right end of the upper wall 1c is connected to the right side wall 1a, and a left end of the upper wall 1c is connected to the left side wall 1b. The right side wall 1a, the left side wall 1b, and the upper wall 1c of the compartment body 1 form a substantially rectangular box. Further, the right side wall 1a, the left side wall 1b, and the upper wall 1c define an opening 1d of the compartment body 1. As shown in FIG. 2, the inside the compartment body 1 defines a storage space 1e configured to accommodate a pocket 53, which will be described below. The opening 1d is located at a rear side of the compartment body 1. The opening 1d connects the storage space 1e of the compartment body 1 and the passenger compartment CR.

The right side wall 1a includes an engagement hole 1f serving as an engaged portion. The left side wall 1b includes an engagement hole (not shown) similar to the engagement hole 1f. The right side wall 1a includes an operation restriction wall 13 serving as an operation restriction body. The engagement hole 1f and the operation restriction wall 13 will be described in detail later.

As shown in FIG. 1, the side panel 3 is arranged at the right sides of the instrument panel 100 and the compartment body 1. The side panel 3 is attached to the instrument panel 100 by engagement pins (not shown). The side panel 3 is removable from the instrument panel 100. The side panel 3 is attached to the instrument panel 100 to form the right side of the instrument panel 100. The side panel 3 is attached to the instrument panel 100 to close the right side of the compartment body 1 and act as the right side of the compartment body 1. The side panel 3 may be attached in a removable manner to both the instrument panel 100 and the compartment body 1 or be attached in a removable manner to only the compartment body 1. The shape of the side panel 3 may be changed.

As shown in FIGS. 1 and 2, the glove door 5 includes a first door panel 5a and a second door panel 5b. The first door panel 5a is substantially flat and forms the outer surface of the glove door 5. The first door panel 5a includes the operation lever 9 and the key cylinder 11. The key cylinder 11 may be shifted between an unlock position and a lock position by a vehicle occupant or the like.

The second door panel 5b is arranged in front of the first door panel 5a so that a storage 50 is defined between the second door panel 5b and the first door panel 5a. A through hole 51 extends through the right side of the second door panel 5b into the storage 50. A through hole similar to the through hole 51 extends through the left side surface of the second door panel 5b (not shown). The second door panel 5b is formed integrally with the pocket 53. The pocket 53 is configured to accommodate small articles.

The glove door 5 is arranged to be pivotal about the lower end of the compartment body 1. The glove door 5 is movable between a closed position shown by solid lines and an open position shown by dashed lines. The glove door 5 is moved to the closed position to close the opening 1d of the compartment body 1. This accommodates the pocket 53 in the storage space 1e as shown in FIG. 2. Further, as shown in FIG. 1, the glove door 5 is moved to the open position to open the opening 1d to the passenger compartment CR. This also opens the pocket 53 to the passenger compartment CR.

The lock mechanism 7 includes the engagement hole 1f of the right side wall 1a, the engagement hole (not shown) of the left side wall 1b, and an actuating unit 70 shown in FIG. 3. As shown in FIG. 2, the engagement hole 1f is arranged at the rear of the opening 1d of the compartment body 1 and in communication with the storage space 1e. The engagement hole 1f is arranged at the right side of the compartment body 1 near the side panel 3. The engagement hole of the left side wall 1b is arranged at the rear of the opening 1d of the compartment body 1 in communication with the storage space 1e in the same manner as the engagement hole 1f.

As shown in FIG. 3, the actuating unit 70 is arranged on the first door panel 5a inside the storage 50. The actuating unit 70 includes a base plate 71, a pinion gear 72, a first engaging member 73, a second engaging member 74, and a coil spring 75. The base plate 71 is attached to the inner surface of the first door panel 5a. The base plate 71 includes a stopper 76 and a spring seat 77. The second door panel 5b is not shown in FIG. 3.

The pinion gear 72 is attached to the base plate 71 in a manner pivotal about a pivot shaft 72a. The pinion gear 72 is pivoted in directions D1 and D2 as shown by the arrows in FIG. 3. The pinion gear 72 includes a biasing member (not shown) that biases the pinion gear 72 in direction D1. Abutment of the pinion gear 72 against the stopper 76 restricts further pivoting in direction D1. FIG. 3 shows a state in which the pinion gear 72 is pivoted in direction D1.

The pinion gear 72 includes a first gear portion 701 and a second gear portion 702. The pinion gear 72 is connected to the operation lever 9 shown in FIG. 1 in a manner allowing for transmission of force. When the key cylinder 11 is located at an unlock position, operation of the actuating unit 70 with the operation lever 9 is allowed. The operation of the operation lever 9 is transmitted to the pinion gear 72. When the key cylinder 11 is located at an unlock position, operation of the actuating unit 70 with the operation lever 9 is restricted. Thus, the operation of the operation lever 9 is not transmitted to the pinion gear 72.

The first engaging member 73 includes a first shaft 73*a* and a first distal end 73*b*. The first shaft 73*a* extends in the sideward direction. The left end of the first shaft 73*a* includes a third gear portion 703. The third gear portion 703 meshes with the first gear portion 701. This connects the first engaging member 73 and the pinion gear 72 in a manner allowing for the transmission of force. The first distal end 73*b* is formed integrally with the right end of the first shaft 73*a*.

The second engaging member 74 includes a second shaft 74*a* and a second distal end 74*b*. The second shaft 74*a* extends in the sideward direction. The second shaft 74*a* is shorter than the first shaft 73*a*. The right end of the second shaft 74*a* includes a fourth gear portion 704. The fourth gear portion 704 meshes with the second gear portion 702. This connects the second engaging member 74 to the pinion gear 72 in a manner allowing for the transmission of force. The second distal end 74*b* is formed integrally with the left end of the second shaft 74*a*.

The coil spring 75 is arranged between the left end of the first shaft 73*a* and the spring washer 77. The coil spring 75 biases the first engaging member 73 toward the right.

The first door panel 5*a* includes a first guide portion 55 and a second guide portion 57. As shown in FIG. 2, the first guide portion 55 extends toward the second door panel 5*b* inside the storage 50. The first guide portion 55 includes a first guide hole 55*a* that guides the first distal end 73*b*. The second guide portion 57 shown in FIG. 3 includes a second guide hole 57*a* that guides the second distal end 74*b* in the same manner as the first guide portion 55.

With the lock mechanism 7, when the pinion gear 72 of the actuating unit 70 is pivoted in direction D1, the biasing force of the coil spring 75 moves the first engaging member 73, with the third gear portion 703 meshed with the first gear portion 701, toward the right inside the glove compartment. Further, the second engaging member 74 is moved, with the fourth gear portion 704 meshed with the second gear portion 702, toward the left inside the glove compartment. As a result, the first distal end 73*b* of the first engaging member 73 is projected out of the glove door 5 from the through hole 51 of the second door panel 5*b* as shown in FIG. 2. Further, the first distal end 73*b* enters and engages the engagement hole 1*f* in the right side wall 1*a*. The second distal end 74*b* of the second engaging member 74 is also engaged with the engagement hole of the left side wall 1*b* (not shown). When the lock mechanism 7 is shifted to a closed state in this manner, the glove door 5 is held by the compartment body 1 at the closed position.

Figure 4:
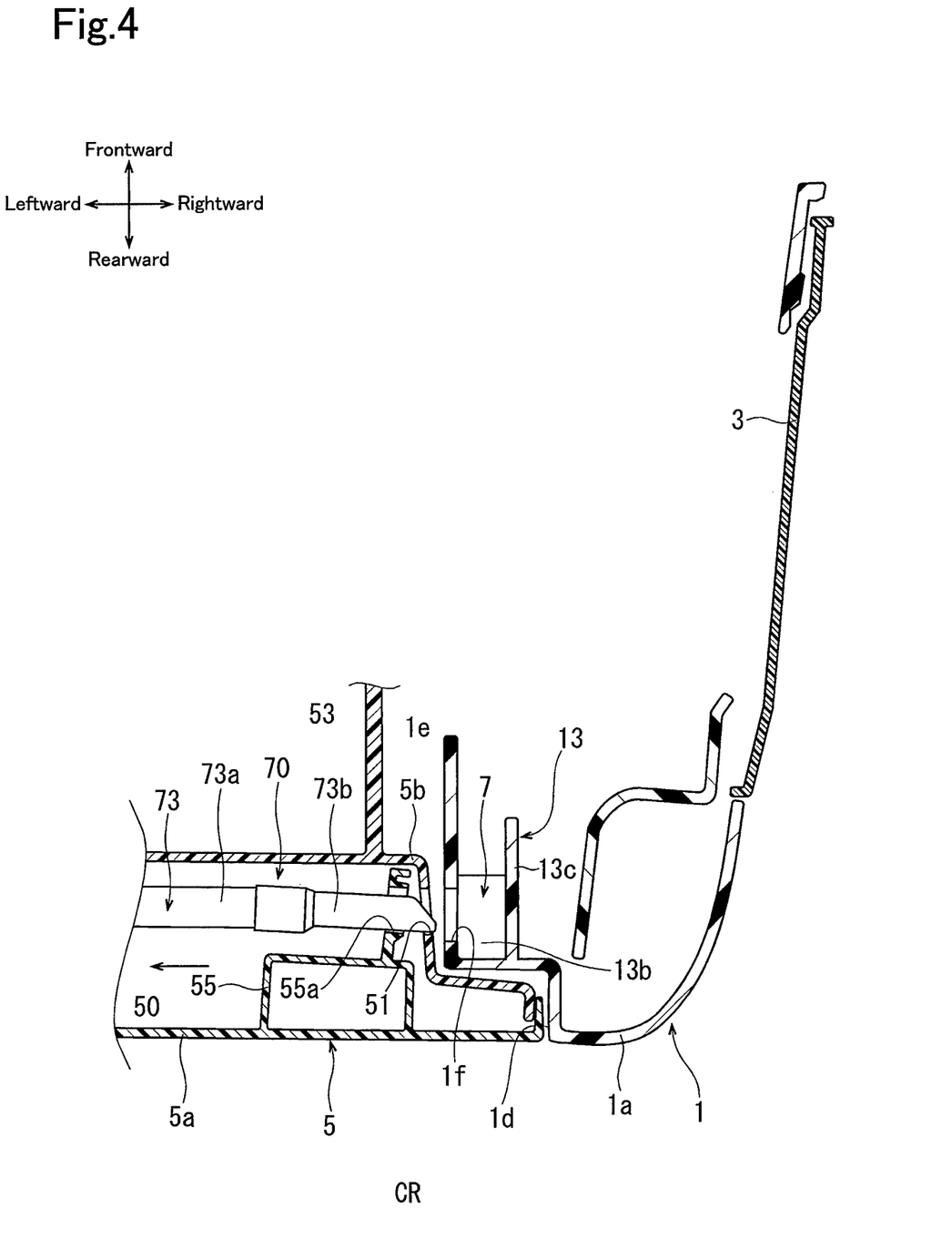
FIG. 4 is a schematic cross-sectional view of the glove compartment when the latch mechanism is in an open state.

If the operation lever 9 is operated when the key cylinder 11 shown in FIG. 1 is located at the unlock position, the pinion gear 72 of the actuating unit 70 is pivoted in direction D2. Thus, the first engaging member 73 is moved, with the third gear portion 703 meshed with the first gear portion 701, toward the left inside the glove compartment against the biasing force of the coil spring 75. The second engaging member 74 is moved, with the fourth gear portion 704 meshed with the second gear portion 702, toward the right inside the glove compartment. Then, the first distal end 73*b* of the first engaging member 73 is retracted into the storage 50 and disengaged from the engagement hole 1*f* as shown in FIG. 4. The second distal end 74*b* of the second engaging member 74 is disengaged from the engagement hole 1*n* the same manner. When the lock mechanism 7 is shifted to the open state in this manner, the glove door 5 is no longer held by the compartment body 1. Thus, the glove door 5 is moved, by its own weight, to the open position shown by the dashed lines in FIG. 1.

When the glove door 5 is at the closed position and the key cylinder 11 is at the lock position, operation of the operation lever 9 is restricted. Thus, even if the operation lever 9 is operated, the pinion gear 72 shown in FIG. 3 does not pivot in direction D2 and maintains the lock mechanism 7 in the closed state.

Figure 5:
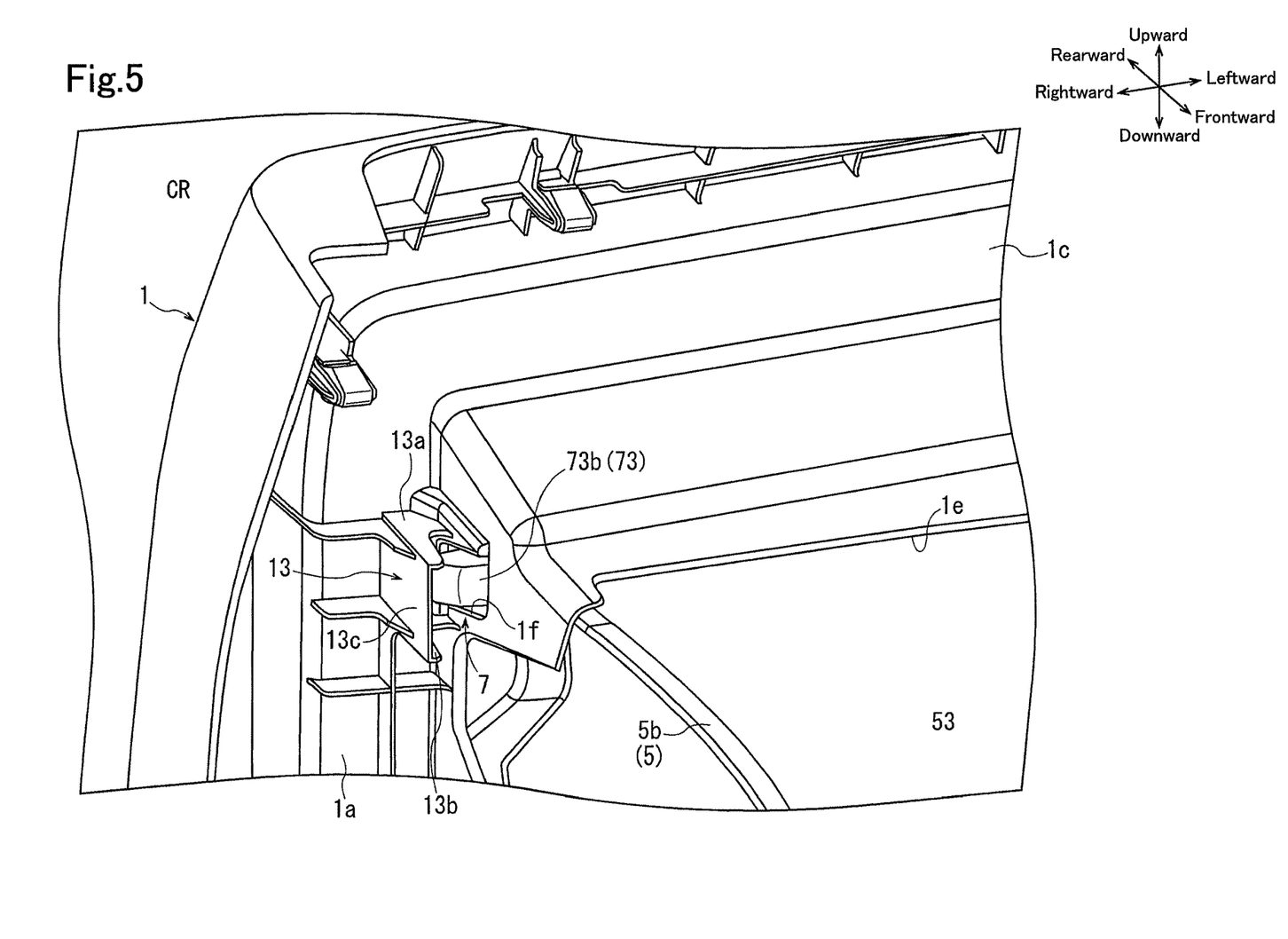

As shown in FIG. 5, the operation restriction wall 13 is formed integrally with the right side wall 1*a*. Since the compartment body 1 is made of plastic as mentioned above, the operation restriction wall 13 is also made of plastic. The operation restriction wall 13 includes a first wall 13*a*, a second wall 13*b*, and a third wall 13*c*. The first wall 13*a* defines the top surface of the operation restriction wall 13. The second wall 13*b* defines the bottom surface of the operation restriction wall 13. The third wall 13*c* is connected to the first wall 13*a* and the second wall 13*b* and defines the right side of the operation restriction wall 13. The operation restriction wall 13 is formed inside the compartment body 1. The operation restriction wall 13 is arranged at the right side of the engagement hole 1*f* and at the right side of the first distal end 73*b* of the first engaging member 73 engaged with the engagement hole 1*f*. The operation restriction wall 13 is formed to be larger than the engagement hole 1*f* and the first distal end 73*b*. The operation restriction wall 13 covers the engagement hole 1*f* and the first distal end 73*b* at the right side of the compartment body 1, that is, near the side panel 3. FIG. 5 shows the compartment body 1 in a state removed from the instrument panel 100. The same applies to FIG. 7 that will be described later.

In the above glove compartment, the side panel 3 may be removed from the instrument panel 100 to perform maintenance on a device such as a fuse box accommodated in the instrument panel 100. Further, when the side panel 3 is removed, the lock mechanism 7 will not be shifted from the closed state to the open state unless the operation lever 9 is operated. This will now be described below based on a comparison with a comparative example.

Figure 9:
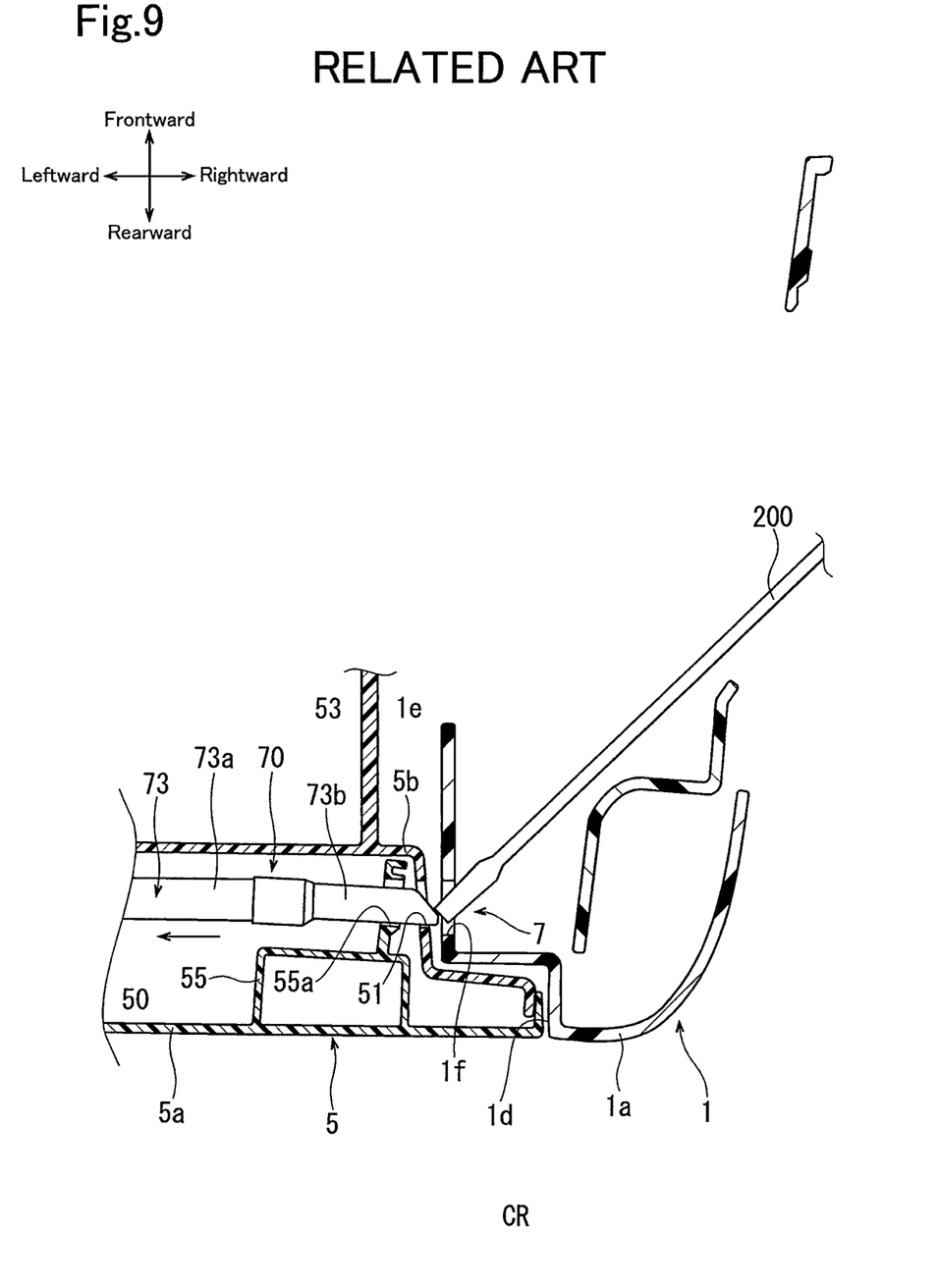
FIG. 9 is a schematic cross-sectional view of the glove compartment in a comparative example.

A glove compartment of the comparative example shown in FIG. 9 has the same structure as the first embodiment except in that it does not include the operation restriction wall 13. With the glove compartment of the comparative example, if the side panel 3 is removed, the first distal end 73*b* can be directly operated from the side surface of the instrument panel 100 with a tool such as a screwdriver 200. If the first distal end 73*b* can be moved to the left inside the glove compartment with the screwdriver 200 as shown in FIG. 9, the first distal end 73*b* will be disengaged from the engagement hole 1*f*. When the first distal end 73*b* of the first engaging member 73 is moved toward the left inside the glove compartment, the pinion gear 72 is pivoted, with the first gear portion 701, shown in FIG. 3, meshed with the third gear portion 703, in direction D2 even if the key cylinder 11 is located at the lock position. Thus, the second engaging member 74 is also moved toward the right inside the glove compartment and the second distal end 74*b* is disengaged from the engaging hole. This shifts the lock mechanism 7 from the closed state to the open state. This shifts the lock mechanism 7 from the closed state to the open state. That is, the glove door 5 is moved from the closed position to the open position without operating the operation lever 9. Thus, theft of small articles from the pocket 53 cannot be prevented even if the glove door 5 is at the closed position regardless of the key cylinder 11 being at the lock position.

Figure 6:
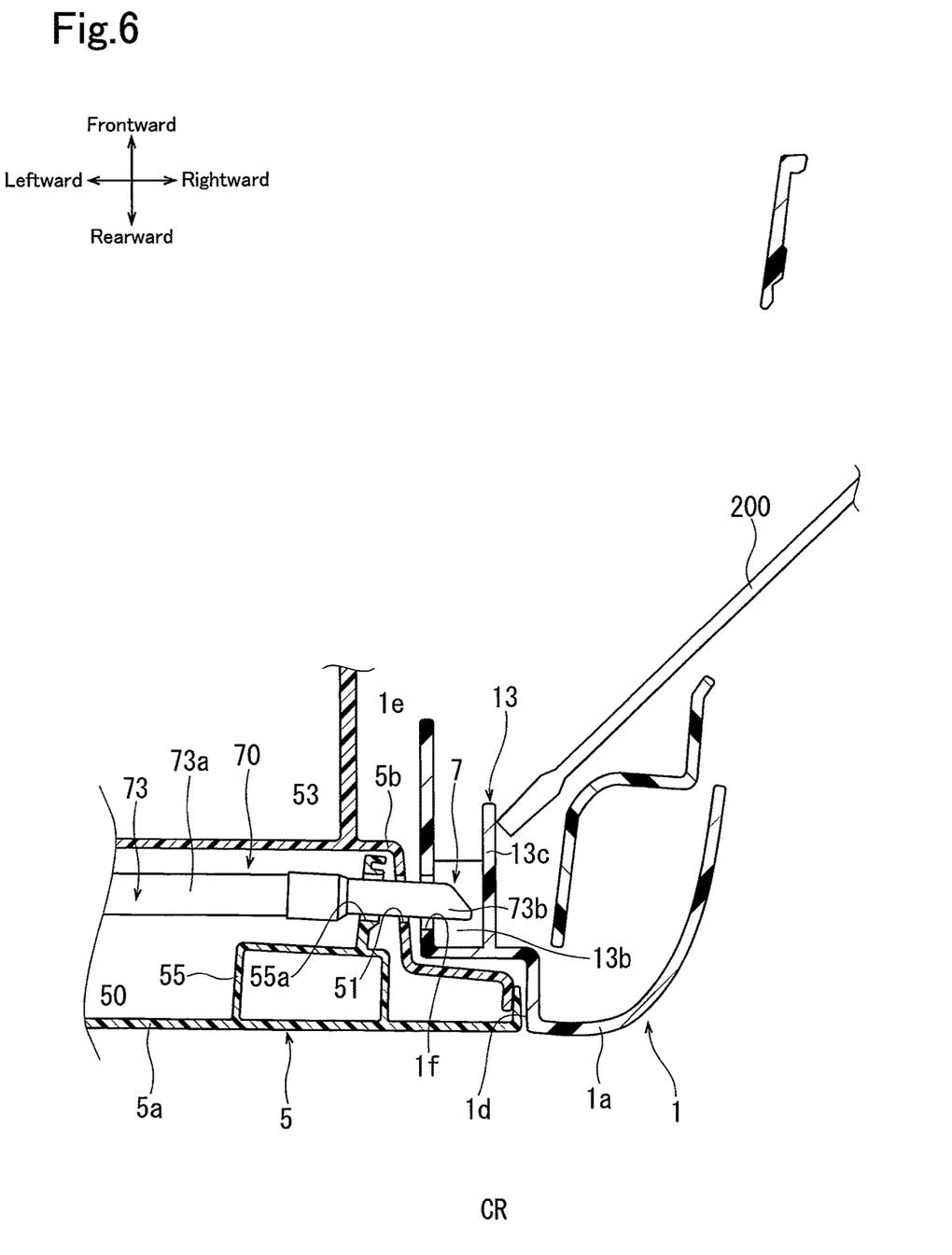
FIG. 6 is a schematic cross-sectional view of the glove compartment when a side panel is removed.

In contrast, with the glove compartment of the first embodiment, the operation restriction wall 13 restricts disengagement of the first distal end 73b from the engagement hole 1f in the side surface of the instrument panel 100 as shown in FIG. 6. That is, with the glove compartment of the first embodiment, the operation restriction wall 13 interferes with the screwdriver 200 inserted from the side surface of the instrument panel 100 from which the side panel 3 is removed. Thus, the first distal end 73b cannot be directly operated with the screwdriver 200 from the side surface of the instrument panel 100. In other words, unless the operation restriction wall 13 is broken, it is difficult to operate the first distal end 73b from the side surface of the instrument panel 100 and disengage the first distal end 73b from the engagement hole 1f. As a result, with the glove compartment of the first embodiment, the lock mechanism 7 cannot be shifted from the closed state to the open state unless the operation lever 9 is operated. That is, the glove door 5 is not moved from the closed position to the open position as long as the glove door 5 is at the closed position and the key cylinder 11 is at the lock position.

Thus, the glove compartment of the first embodiment may effectively prevent theft.

The glove compartment includes the operation restriction wall 13 formed integrally with the right side wall 1a. This reduces the number of parts of the glove compartment and simplifies the manufacturing of the glove compartment.

Second Embodiment

Figure 7:
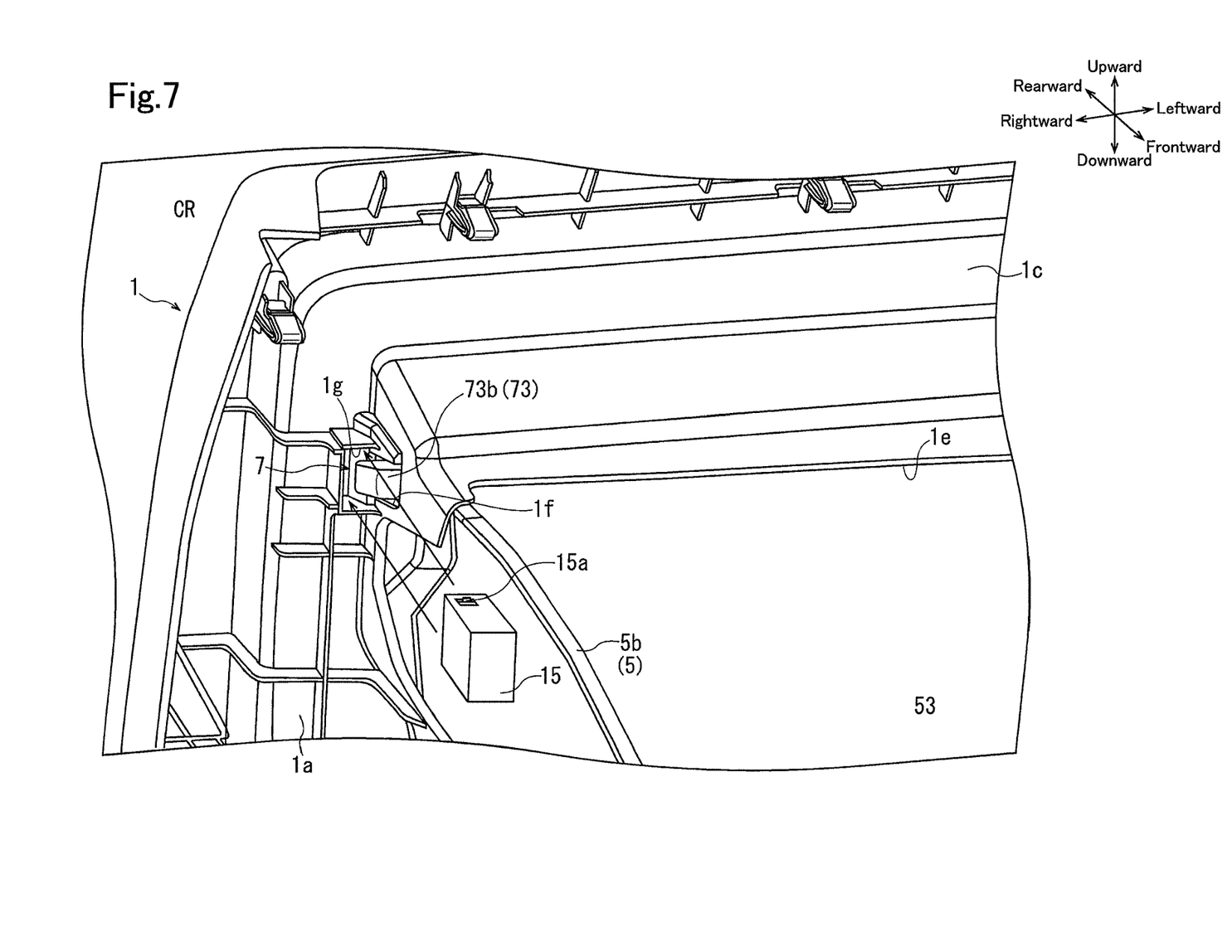
FIG. 7 is a perspective view of the operation restriction body or the like of the glove compartment according to a second embodiment.

As shown in FIG. 7, with the glove compartment of the second embodiment, instead of the operation restriction wall 13, the right side wall 1a of the compartment body 1 includes an operation restriction case 15 that serves as an operation restriction body. The operation restriction case 15 is formed separately from the compartment body 1. The operation restriction case 15 is a substantially rectangular box made of metal. The operation restriction case 15 includes a locking claw 15a. The right side wall 1a also includes a fixing portion 1g near the engagement hole 1f. The material and shape of the operation restriction case 15 may be changed.

Figure 8:
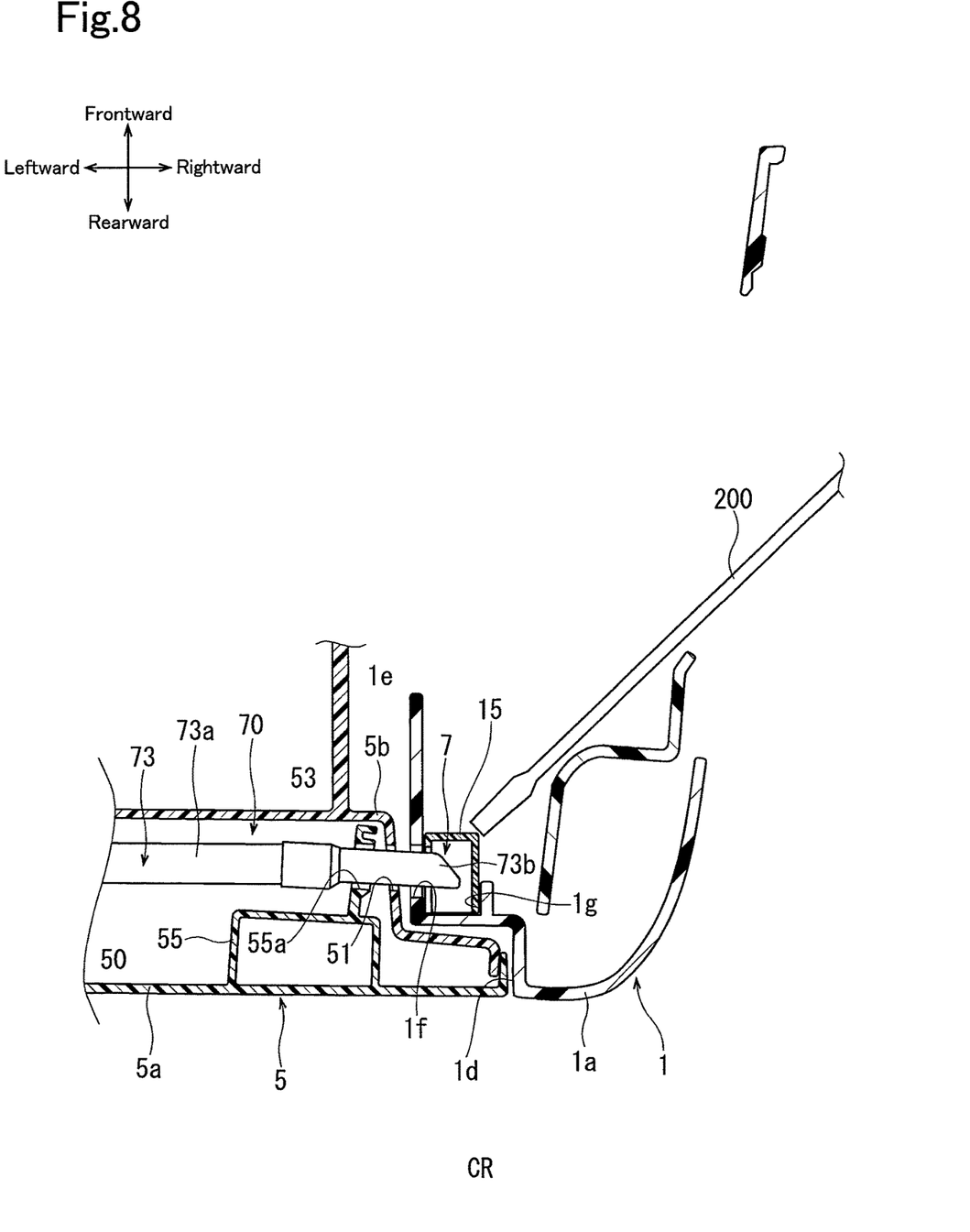
FIG. 8 is a schematic cross-sectional view of the glove compartment when the side panel is removed.

The locking claw 15a is locked to the fixing portion 1g to fix the operation restriction case 15 to the right side wall 1a where the fixing portion 1g is formed. Thus, as shown in FIG. 8, the operation restriction case 15 accommodates the first distal end 73b and entirely covers the engagement hole 1f and the first distal end 73b. Otherwise, the structure of the glove compartment is the same as the glove compartment of the first embodiment. Same reference numerals are given to those components that are the same as the corresponding components of the first embodiment. Such components will not be described in detail. The description hereafter will focus on differences from the first embodiment.

With this glove compartment, the operation restriction case 15 also prevents the first distal end 73b from being disengaged from the engagement hole 1f from the side surface of the instrument panel 100. Further, the operation restriction case 15 entirely covers the engagement hole 1f and the first distal end 73b. Thus, it is almost impossible to directly operate the first distal end 73b from the side surface of the instrument panel 100. Further, the operation restriction case 15 is made of metal and the operation restriction case 15 cannot easily be broken.

Further, the operation restriction case 15 and the compartment body 1 are separately formed. Thus, the compartment body 1 and the operation restriction case 15 have a high degree of design freedom. Other advantages of this glove compartment are the same as the glove compartment of the first embodiment.

Embodiments are not limited to the first and second embodiments 1 and 2 and may be changed within the scope of this disclosure.

For example, the pocket 53 may be removed from the second door panel 5b. The glove compartment may be configured such that the small articles are accommodated in the storage space 1e.

An electric lock or the like may be used as a lock mechanism instead of the key cylinder 11.

The present examples and embodiments are to be considered as illustrative and not restrictive, and the invention is not to be limited to the details given herein, but may be modified within the scope and equivalence of the appended claims.

The invention claimed is:

1. A glove compartment arranged in an instrument panel located in a passenger compartment, the glove compartment comprising:
   a compartment body fixed to the instrument panel, wherein the compartment body includes an opening through which an inside of the compartment body and the passenger compartment are in communication;
   a side panel attached in a removable manner to at least one of the instrument panel or the compartment body, wherein the side panel forms a side surface of the instrument panel or a side surface of the compartment body;
   a glove door arranged on the compartment body and movable between a closed position that closes the opening and an open position that opens the opening to the passenger compartment;
   a latch mechanism configured to be shifted between a closed state in which the glove door is held on the compartment body at the closed position and an open state in which the glove door is not held on the compartment body;
   an operation unit operated to shift the latch mechanism from the closed state to the open state; and
   a lock mechanism configured to be shifted between an unlock position that allows operation of the latch mechanism with the operation unit and a lock position that restricts operation of the latch mechanism with the operation unit, wherein the latch mechanism includes an engaged portion formed near the side panel inside the compartment body, and
   an engaging member arranged on the glove door,
   wherein the engaging member is engaged with the engaged portion in the closed state and disengaged from the engaged portion in the open state,
   wherein the compartment body includes an operation restriction body that restricts operation of the engaging member from the side surface of the instrument panel or the side surface of the compartment body so that the engaging member is not disengaged from the engaged portion.

2. The glove compartment according to claim 1, wherein the operation restriction body is formed integrally with the compartment body.

3. The glove compartment according to claim 1, wherein the operation restriction body is formed separately from the compartment body, and the operation restriction body is configured to be fixed to the compartment body.

* * * * *